United States Patent [19]

Deo

[11] Patent Number: 5,594,227
[45] Date of Patent: Jan. 14, 1997

[54] SYSTEM AND METHOD FOR PROTECTING UNAUTHORIZED ACCESS TO DATA CONTENTS

[75] Inventor: Vinay Deo, Redmond, Wash.

[73] Assignee: Microsoft Corporation, Redmond, Wash.

[21] Appl. No.: 412,295

[22] Filed: Mar. 28, 1995

[51] Int. Cl.$^6$ ........................................... G06K 5/00
[52] U.S. Cl. ................... 235/380; 902/4; 902/26
[58] Field of Search ................ 902/4, 5, 26; 235/380, 235/379

[56] References Cited

U.S. PATENT DOCUMENTS

| | | | |
|---|---|---|---|
| 4,449,040 | 5/1984 | Watsugka et al. | 235/380 |
| 4,453,074 | 6/1984 | Weinstein | 235/380 |
| 4,667,087 | 5/1987 | Quintana | 235/380 |
| 4,684,791 | 8/1987 | Bito | 235/380 |
| 4,710,613 | 12/1987 | Shigenaga | 235/380 |
| 4,801,787 | 1/1989 | Suzuki | 235/380 |
| 4,839,506 | 6/1989 | Homma et al. | 235/379 |

Primary Examiner—Donald T. Hajec
Assistant Examiner—Jeffrey R. Filipek
Attorney, Agent, or Firm—Lee & Hayes, PLLC

[57] ABSTRACT

A smart card protection system is provided for protecting against unauthorized access of data contents on a smart card through human or electronic-machine tampering. The smart card protection system includes a smart card having an authorized password stored thereon for associated data and a smart card terminal to supply an entered password for accessing the data on the smart card. The smart card includes a comparator to compare the entered password to the stored password, and two counters: a fail counter and a delay counter. The fail counter keeps a fail count indicative of the number of times that the entered password fails to match the stored password. The fail counter is incremented when the entered password fails to match the stored password and decremented when the entered password successfully matches the stored password. The delay counter maintains a delay count that is incremented each time the comparator compares the entered password to the stored password regardless of a match. In the event that the fail count is not equal to its starting value of zero, the smart card denies access to the data contents. Access is denied even though a match might occur after initial misses because the fail count is not zero. Further, when access is denied, a delay period is imposed before comparing the next entered password received from the smart card terminal. The delay period increases each time based upon a function of the delay count.

28 Claims, 6 Drawing Sheets

SYSTEM AND METHOD FOR PROTECTING UNAUTHORIZED ACCESS TO DATA CONTENTS

TECHNICAL FIELD

This invention relates to smart card protection systems for protecting against unauthorized access of data contents on a smart card through use of human or electronic-machine intervention. This invention also relates to methods for protecting against unauthorized access of data contents on a smart card. This invention further relates to protection devices and methods used in data protection systems that perform password verification for purposes of permitting or denying access to data contents.

BACKGROUND OF THE INVENTION

Passwords have been used for guarding authorized access to computers and data for quite some time. However, password verification schemes are most reliable only when the password is manually entered by a human. It is nearly impossible for an unauthorized user to manually enter thousands, or even millions, of different "guess" passwords in an effort to discover the authorized password. The physical and time requirements of inputting many different passwords and awaiting clearance is enough to discourage unauthorized users. The password verification scheme is therefore quite reliable when human interaction is required.

Password verification schemes are not as effective, however, when human interaction cannot be guaranteed. Electronic-machines can be programmed to supply thousands or millions of "guess" passwords in a rather short period of time. Furthermore, the guess patterns are meticulous and comprehensive to avoid missing any possible permutation. Such electronics can often times quickly discover the appropriate password, thereby gaining access to the protected data. Accordingly, it is an object of this invention to provide an enhanced password verification scheme that protects against unauthorized access to data through the use of human or electronic-machine intervention.

One important area that passwords are used today is in the context of ATMs (Automated Teller Machines) owned by banks or other service providers. Bank members are given special ATM cards for use in the ATMs to permit automated access to the member's account. The ATM cards that are primarily in use today consist of magnetic-stripe memory cards that have a single magnetic stripe on one side. The magnetic stripe contains information regarding the bank, the member, and his/her account. The member inserts the magstripe card into the ATM and enters a four digit password or PIN (Personal Identification Number). The member is given three opportunities to enter the correct PIN. If the member fails the third time, access to the data is locked by the ATM for a period of time, such as 24 hours, before accepting a new set of PIN numbers. The member then has the option of waiting or personally taking the card to the bank to have the system reinitialized. The "three-misses-and-out" scheme guards against an unauthorized person who improperly gains possession of the ATM card and randomly enters many four digit PINs in an effort to gain access to the member's bank accounts.

Today, there is a movement toward use of "smart cards" instead of mag-stripe cards. A "smart card" is a credit card that has a built-in microcontroller (MCU) which enables the card to modify, or even create, data in response to external stimuli. The microcontroller is a single-wafer integrated circuit (IC) which is mounted on an otherwise plastic credit card.

The traditional mag-stripe ATM cards require password verification on-line with the ATM, where the locking and unlocking of data is done by the back end computer resident in the ATM. Since the ATM cards are single purpose (i.e., their only function is interfacing with the bank), losing access to the bank after three or four attempts is an acceptable form of security. Banks can simply replace the locked out ATM card because the banks already have all the information contained on the card. In contrast, smart cards are themselves a data processor that can be used for multiple purposes. Through the use of the processor, smart cards can perform password verification off-line without connection to a back end computer and are self-validating with the access security code resident thereon. A scheme where three or four failed password attempts cause the entire card to be locked is not useful in the smart card environment because locking the entire card might prohibit the smart card from being used for another unrelated purpose, like starting a car or gaining entry into an apartment building. Additionally, a smart card cannot be easily replaced by one entity (such as the bank) because the multi-purpose smart card stores much more data than that which is available at a single location outside of the card.

Conventional password schemes are not effective in the smart card context. Smart card readers are easy and inexpensive to emulate. Such readers can be programmed to check all possible access codes for a smart card in a relatively short period of time. Unauthorized persons might therefore be able to steal a user's smart card and gain access to its contents before any precautionary measures can be taken after the missing card is discovered.

It is therefore an object of this invention to provide a password verification scheme that can be used in the smart card environment which greatly reduces the chance of unauthorized access through electronic or manual means.

SUMMARY OF THE INVENTION

This invention provides a smart card protection system for protecting against unauthorized access of data contents on a smart card through human or electronic-machine tampering. The smart card protection system includes a smart card having an authorized password stored thereon for associated data and a smart card terminal to supply an entered password for accessing the data on the smart card. The smart card includes a comparator to compare the entered password to the stored password. A fail counter is operatively coupled to the comparator to keep a fail count indicative of the number of times that the entered password fails to match the stored password. The fail counter is incremented away from a reference value (such as zero) when the entered password fails to match the stored password and decremented back toward the reference value when the entered password successfully matches the stored password. A delay counter is also operatively coupled to the comparator to maintain a delay count that incremented each time the comparator compares the entered password to the stored password.

In the event that the fail count kept in the fail counter does not equal the reference value, the smart card denies access to the data contents. Access is denied even though a match might occur after the initial misses because the fail count is not zero. Further, when access is denied, a delay period is imposed before comparing the next entered password received from the smart card terminal. The delay period preferably increases with each access denial based upon a function of the delay count. One technique is to simply double the delay period each time access is denied.

The security system of this invention effectively prevents access of an unauthorized user while enabling the authorized user quick access, even if he/she enters the wrong password more than a preset number of times. If the authorized user mistakenly enters the incorrect password, the user simply enters the correct password a repeated number of times until the fail count is reduced to its starting reference value. It is presumed that only the authorized user would know to repeatedly enter the same correct password. Access is permitted when a match occurs and the fail count is at its reference value. Initial delay periods are small and do not inconvenience the authorized user.

For an unauthorized user trying to guess the password through manual or electronic means, the system quickly accumulates a rather high delay period as well as a high fail count. When the password-guessing machine actually hits the correct password, it would go undetected because the fail count is not at its reference value and thus access would be denied. Moreover, the delay period continues to increase or remains constant regardless of a match or non-match to thereby prevent any indication of a correct entry.

According to another aspect of this invention, a method for protecting against unauthorized access of data contents on a smart card is described.

BRIEF DESCRIPTION OF THE DRAWINGS

The same reference numerals are used throughout the disclosure to reference like components and features.

DETAILED DESCRIPTION OF THE PREFERRED EMBODIMENT

This invention concerns data protection techniques used in systems that perform password verification for purposes of permitting or denying access to data content. The invention is described in the preferred context of smart cards, although aspects of this invention may be used in other applications.

Figure 1:
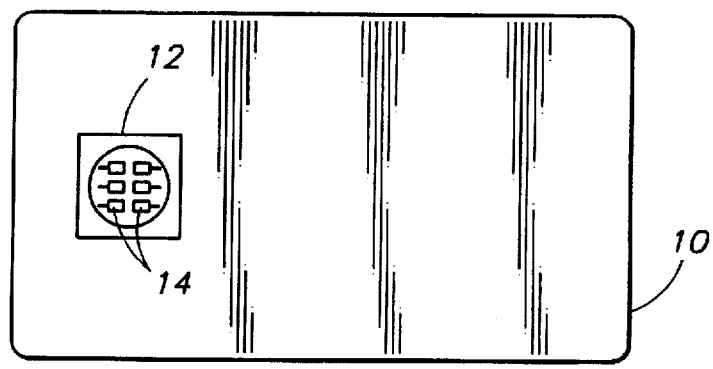
FIG. 1 is a diagrammatic illustration of a smart card.

FIG. 1 shows an IC (integrated circuit) card or smart card 10. It is the size of a credit card and has a built-in microcontroller (MCU) 12 which enables the card to modify, or even create, data in response to external stimuli. Microcontroller 12 is a single wafer integrated circuit (IC) which is mounted on an otherwise plastic credit card. Conductive contacts 14 are also formed on the IC to enable interfacing to external read/write equipment. A smart card is physically constructed in accordance with the international standard ISO-7816 which governs size and bendable limits of the plastic card, as well as size and location of the silicon integrated circuit.

Figure 2:
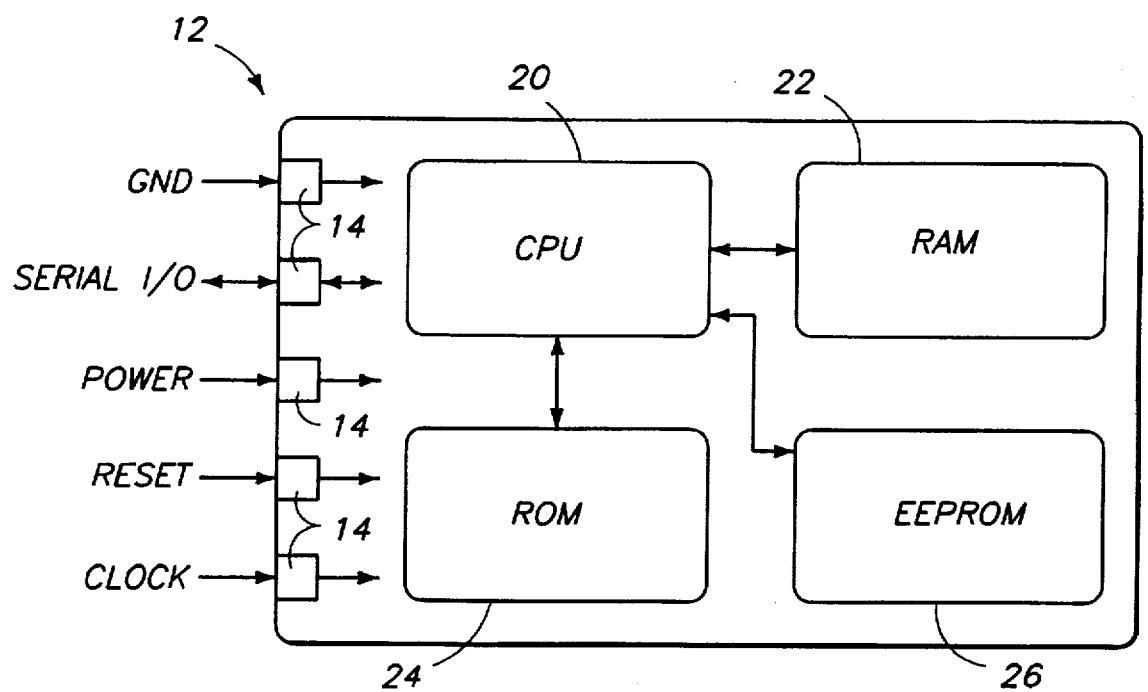
FIG. 2 is a block diagram of a microcontroller integrated circuit used in the FIG. 1 smart card.

FIG. 2 shows the smart card microcontroller IC 12 is more detail. It includes a CPU 20, a volatile rewritable RAM (Random Access Memory) 22, a ROM (Read Only Memory) 24, and an EEPROM (Electrically Erasable Programmable ROM) 26. The set of conductive contacts 14 are internally coupled to CPU 20 to supply data and control information that are received from the external accessing equipment. As an example, clock, reset, power, data I/O, and ground can be provided at IC contacts 14. One suitable microcontroller-based single-wafer IC that can be used in smart cards is available from Motorola Corporation under model number MC68HC05SC21. In this chip, the data I/O is serial.

Smart cards can be concurrently used in many different applications and environments. For instance, smart cards can be used to store financial data for banking purposes, maintain medical information for use by health care providers, or organize account information for routinely paid services such as cable TV. The smart card operating system stores a variable length password with each type of data that is to be protected. For instance, one password might be used to access financial data, while another password might be used to access health care information. The passwords and their lengths are determined by the software which creates and owns the data item on the smart card. The financial data placed on the user's smart card by the bank's software will be accompanied by an authorized password known by the bank's software. This allows the bank to access the financial data at a later time by entering the authorized password. Additionally, the password associated with the data can be changed periodically by the bank or other institution to further assist in reducing fraud.

By associating the password with each data type, other information providers cannot gain access to other data on the card. For example, the bank is precluded from accessing health care data which is privileged and confidential between the cardholder and his/her health care provider.

This invention concerns a smart card protection system for protecting against unauthorized access of data contents on a smart card through use of human or electronic-machine intervention. For purposes of continuing discussion, aspects of this invention will be described in the context of employing smart cards to store financial data.

Figure 3:
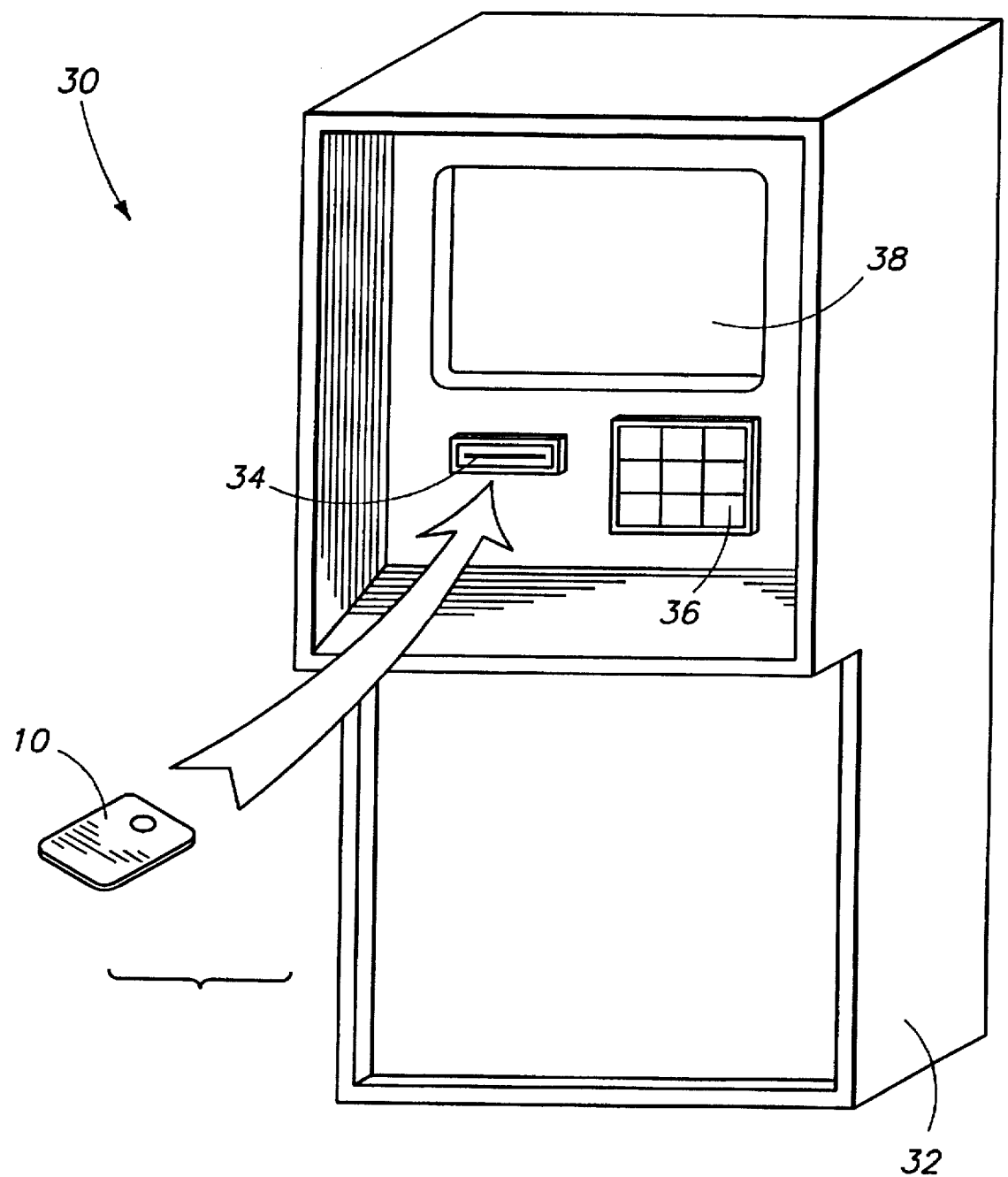
FIG. 3 is a diagrammatic illustration of a smart card protection system according to an embodiment of this invention.

FIG. 3 shows a smart card protection system 30 in the context of an ATM banking system. Smart card protection system 30 includes smart card 10 and a smart card terminal 32, which is embodied as an ATM. When the cardholder wishes to make a financial transaction, the cardholder inserts smart card 10 into a card reading slot 34 of the ATM. The user may or may not need to enter a PIN on keypad 36. It is assumed that the ATM can verify the owner is some trustworthy manner. After user verification, the ATM supplies a password which is unique to the user in an effort to access the financial data on the smart card. In other environments where such high security is not required, the passwords supplied to the smart card could be unique to the service provider instead of each user (e.g., keeping track of frequent flyer mileage on a particular airline). The smart card analyzes the entered password and if it matches the password stored on the smart card, permits access to the data. Terminal 32 also includes a display 38 for use in instructing and informing the cardholder during this process. ATM 32 is conventional and thus is not described in detail.

Figure 4:
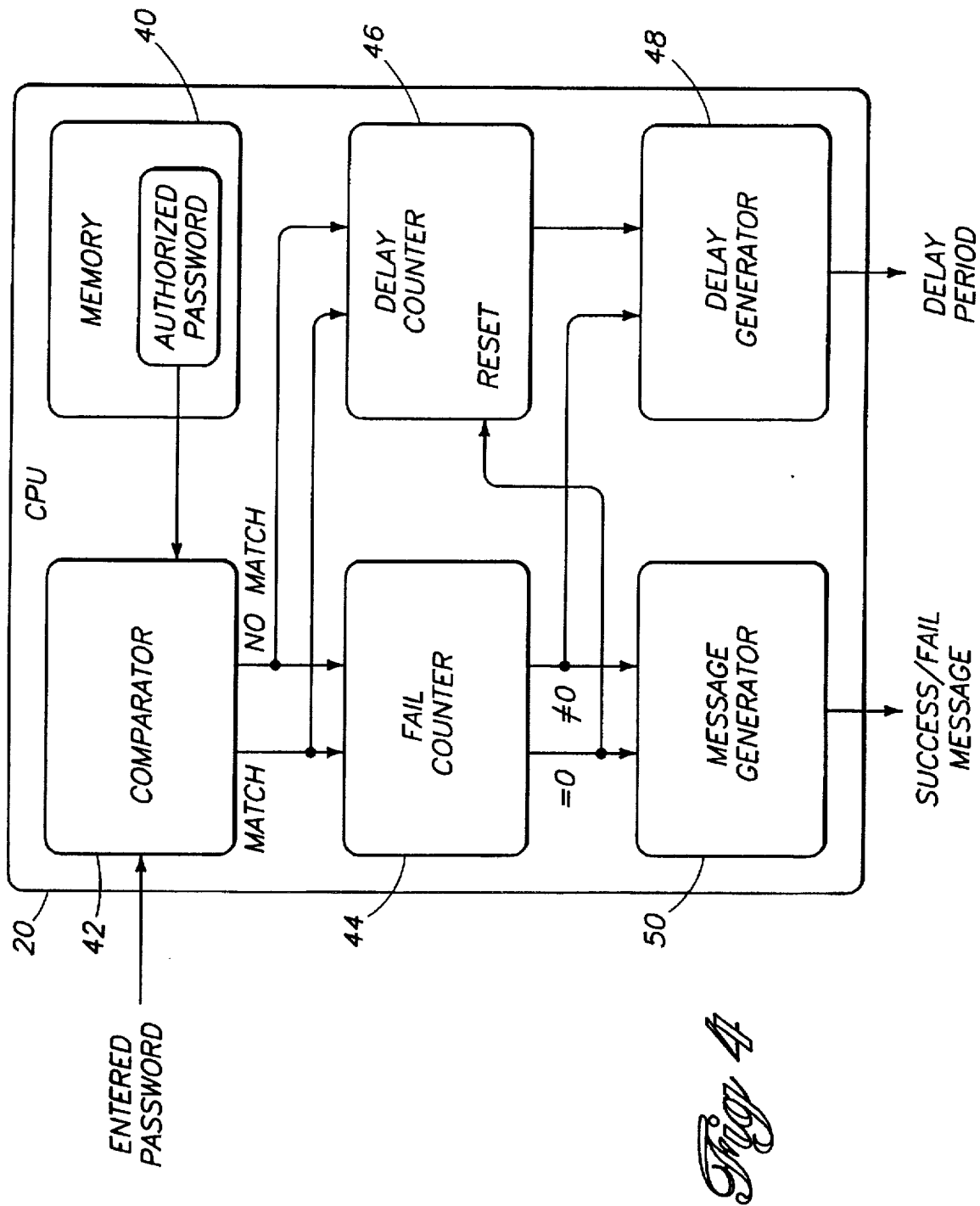
FIG. 4 is a block diagram of a CPU (Central Processing Unit) of the smart card microcontroller according to one embodiment of this invention.

FIG. 4 shows CPU 20 of smart card 10 constructed according to this invention. The smart card CPU 20 has an internal memory 40 which stores the authorized password that is associated with a particular data. The entered password received from the ATM is received at the data input serial I/O 14 (FIG. 2) and transferred to CPU 20. CPU 20 includes a comparator 42 which compares the entered password supplied by the bank software to the authorized password stored on the card. If the entered and stored passwords match, the comparator 42 outputs a hit or "match" signal. If no match occurs, the comparator returns a miss or "no match" signal. Two signals are illustrated in FIG. 3 to assist in describing the operation of the password verification scheme of this invention. It is noted, however, that only one binary signal can be output, whereby a first binary value, such as a "1", means a match has occurred and a second binary value, such as a "0", means a match did not occur.

In the preferred embodiment, CPU 40 has two counters operatively coupled to the comparator to receive the match and non-match signals: a fail counter 44 and a delay counter 46. Fail counter 44 keeps a fail count indicative of the number of times that the entered password fails to match the authorized password. Fail counter 44 is preferably an up/down counter which is initialized to a reference value, such as 0. When the comparator returns a "no match", the fail counter increments the fail count away from the zero reference value. Conversely, when the comparator returns a "match", the fail counter decrements the fail count back toward the zero reference value.

Delay counter 46 maintains a delay count indicative of the number of times that the entered password is compared to the authorized password until access is permitted. Delay counter 46 is preferably an up counter which is initialized to a starting value, such as 0. When the comparator makes a comparison and returns a "match" or "no match", the delay counter increments the delay count.

According to this invention, access to the data contents on the smart card is denied when the fail count kept by the fail counter 44 does not equal its references value (i.e., 0). Rather, access is only permitted when the fail count equals the reference value and the entered password matches the stored authorized password.

When access is denied, the smart card imposes a delay period before undertaking a subsequent comparison of the entered and authorized passwords. CPU 20 includes a delay generator 48 which produces a delay period any time access is denied (as indicated by the "≠0" signal from fail counter 44). The delay period preferably monotonically increases according to a function of the delay count received from delay counter 46. More preferably, the delay period (T) produced by the delay generator doubles for each increment of the delay count (DelayCount) according to the following function:

$$T = 2^{DelayCount}$$

The delay period is preferably measured in seconds, so that early mistakes do not penalize an authorized user. However, the delay becomes burdensome as more improper entries are made. The delay counter 46 is reset only after access to the card is permitted (as indicated by the "=0" signal from fail counter 44).

A message generator 50 is provided to return either a SUCCESS message when access to the data contents is permitted or a FAIL message when access is denied. The message is sent back to the ATM 32 and displayed on screen 38 (FIG. 3). The FAIL or SUCCESS message is given only after the delay period elapses. This forces the user/machine to wait the full delay time before they know the outcome of the entered password. Additionally, this ensures that timely terminating power to the smart card in an effort to bypass the delay period will not work.

It is noted that the components described above with reference to FIG. 4 are formed in the operating system of the smart card in the preferred implementation.

The smart card protection system of this invention is effective against both human tampering, where an individual attempts to manually input a number of "guess" passwords, and electronic-machine tampering, where a smart card reader is programmed to electronically input "guess" passwords in a systematic manner. The fail counter and delay counter provide a simple protection device which confuses unauthorized humans or machines as to what is the proper password is, while still permitting access to authorized users even if they repeatedly input the wrong password by mistake. Consider the following three examples.

EXAMPLE ONE

The first example concerns an authorized user who properly enters the correct password on the first attempt (or a bank's software which properly submits the correct password on the first try). The comparator 42 compares the entered password to the authorized password and returns a "match". At this point, the fail counter 14 has a fail count equal to zero (its reference value). Thus, access is permitted and a SUCCESS message is returned to the ATM and the cardholder is allowed to enter his/her desired transaction.

EXAMPLE TWO

A second example involves an authorized user who mistakenly enters the wrong password three straight times. For the first improper entry, the comparator returns a "no match" and the fail count and the delay count is incremented to one. A small delay period of $2^1$ or 2 seconds is produced by delay generator 48 and imposed on the system. It is noted that the delay can be conducted before the delay count is incremented, in which case the first delay period will be $2^0$ or 1 second. A FAIL message is returned to the ATM screen to inform the user. Following the delay period, the user enters the second incorrect password. Again, this causes an increment in both the fail count and delay count to two. A slightly greater delay period of $2^2$ or 4 seconds is then imposed on the system before accepting and comparing the next password. The third incorrect entry increments both counts to three, and causes a delay of $2^3$ or 8 seconds.

At this point in our second example, the authorized user remembers the correct password and begins entering the correct password. The comparator 42 returns a "match" signal and the fail counter 44 decrements the fail count back to two. However, the delay counter 46 continues to increment the delay count to four. Although the passwords did match, the fail count is not equal to its reference value of 0 and thus access is denied. The message generator 50 therefore returns a FAIL message. The authorized user knows his/her own password and thus is presumed to be able to enter the correct password a repeated number of times. Alternatively, the authorized terminal software will know the correct password and will be programmed to supply it continuously until it gains access to the data. The user therefore inputs the same password again following the now 16 second delay (i.e., $2^{DelayCount}=2^4=16$). Once again, the comparator 42 outputs a "match" signal, the fail count is decremented to one and the delay count is incremented to five. Since the fail count still is not equal to zero, access is denied and a FAIL message is again returned. Finally, upon the third correct entry following the 32 second delay period (i.e., $2^6=32$), the fail count is decremented to its reference value of zero, and access is permitted. The message generator returns a SUCCESS message, and the delay counter 46 is reset.

The following table 1 summarizes this second example:

TABLE 1

| | | Example Two | | | |
|---|---|---|---|---|---|
| Entry | Result | Fail Count | Delay Count | Delay Period | Message |
| 1 | No Match | 1 | 1 | 2 sec | FAIL |
| 2 | No Match | 2 | 2 | 4 sec | FAIL |
| 3 | No Match | 3 | 3 | 8 sec | FAIL |
| 4 | Match | 2 | 4 | 16 sec | FAIL |
| 5 | Match | 1 | 5 | 32 sec | FAIL |
| 6 | Match | 0 | reset | 0 | SUCCESS |

According to this example, the user only receives notification of SUCCESS and access to the data when (1) the entered password and stored password match, and (2) the fail count is zero.

EXAMPLE THREE

A third example involves an unauthorized user attempting to gain access through an electronic decoder that is programmed to systematically attempt thousands or millions of "guess" passwords. Typically, these machines are designed to try each password once and then proceed to the next guess. Because this protection scheme requires a dual test of a password match and a fail count of zero, the electronic guessing machine will not experience any success upon entering the correct password if the fail count is not zero. Upon proper entry, only the internal fail count is decremented, but access is denied and a FAIL message is returned. Moreover, the delay period continues to increase (or remains constant) even after supplying the correct password to prevent any feedback that the correct password was entered. The electronic tampering device is therefore unable to detect when an appropriate password was entered.

The following table 2 summarizes this third example:

TABLE 2

| | | Example Three | | | |
|---|---|---|---|---|---|
| Entry | Result | Fail Count | Delay Count | Delay Period | Message |
| 1 | No Match | 1 | 1 | 2 sec | FAIL |
| 2 | No Match | 2 | 2 | 4 sec | FAIL |
| 3 | No Match | 3 | 3 | 8 sec | FAIL |
| . | . | . | . | . | . |
| . | . | . | . | . | . |
| 10 | No Match | 10 | 10 | 1024 sec | FAIL |
| 11 | Match | 9 | 11 | 2048 sec | FAIL |
| 12 | No Match | 10 | 12 | 4096 sec | FAIL |
| . | . | . | . | . | . |
| . | . | . | . | . | . |

TABLE 2-continued

| | | Example Three | | | |
|---|---|---|---|---|---|
| Entry | Result | Fail Count | Delay Count | Delay Period | Message |
| . | . | . | . | . | . |

In table 2, the match occurs on the eleventh entry. The fail count is decremented, but access is denied because the fail count does not equal zero. The delay period continues to double and the FAIL message is returned.

To make a thorough search for the authorized password, the electronic device must be programmed to start with a value and supply it a number of repeated times so that when it guesses the correct password, it will gain access. For example, assume that the fail counter and delay counter are each four bit counters. The maximum value that each counter can store is 16. Every time a password match fails, the smart card operating system delays 1 second, 2 seconds, 4 seconds, ... , 18.2 hours before returning the FAIL/SUCCESS message. Once the delay counter reaches the maximum value, the delay period remains constant thereafter at, in this case, 18.2 hours.

Assume further that the password is seven bits long, thereby providing a guessing space of 127 numbers. The delay period remains constant at 18.2 hours and is not decremented when the correct password is guessed. Thus, the delay profile is as follows:

1st incorrect guess=1 sec+2 sec+. . . +65536 sec=12107 sec=36.4 hrs

2nd incorrect guess=65536 sec+. . . +65536 sec=1048576 sec=12.1 days and so on.

On average, the fraudulent terminal will need to guess one-half of the available numbers (127/2=64). At this pace, the terminal will require 64×12.1 days or 2.1 years to discover the correct password. The fraudulent terminal cannot determine whether it has the correct password unless it really waits out the entire delay period. If it disconnects the power to avoid that delay, the fail counter will not be decremented. Therefore, even after applying a correct password 16 times, the smart card operating system will not return a SUCCESS message.

It is noted that if the card has been tampered with, the legitimate cardholder will know because the delay period will be long. The authorized terminal software will continue to supply the correct password until access is gained, even though this might take some time. In this example, the cardholder will have to wait 12 days while the authorized terminal repeatedly inputs the proper password before the card becomes usable again. Although perhaps this delay is inconvenient, it is better than declaring the card unusable and losing the data stored thereon.

The smart card security scheme of this invention effectively prevents access of an unauthorized user (either human or machine) while still enabling the authorized user quick access. Unlike the "three-misses-and-out" strategy of conventional ATM protection schemes, this protection system permits access even if the cardholder or bank mistakenly enters the wrong password more than three times. Further, there is no need to lock the data after a preset number of failures. The simple protection device is effective, and requires little processor resources in the smart card CPU.

Figure 5:
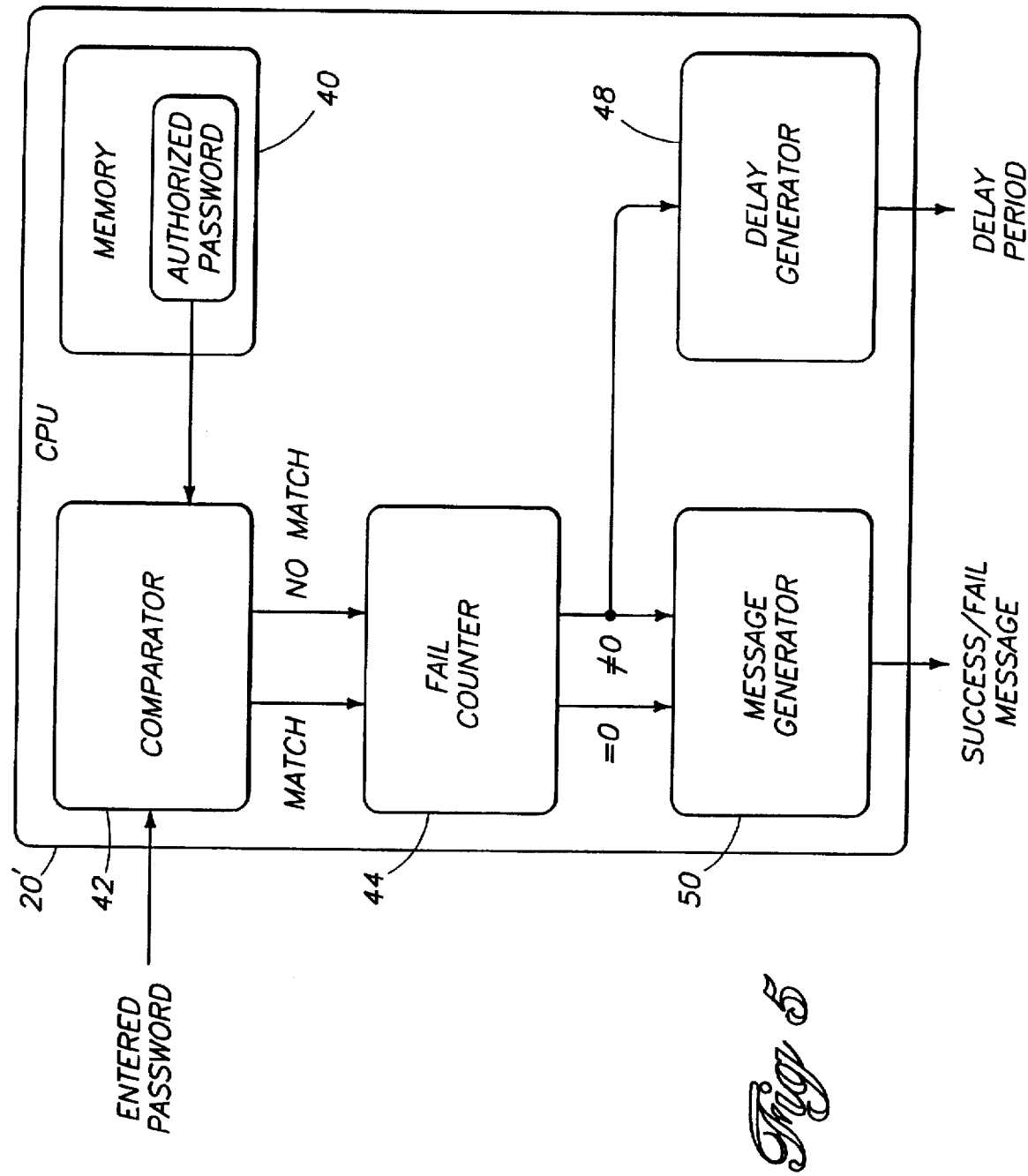
FIG. 5 is a block diagram of a CPU of the smart card microcontroller according to another embodiment of this invention.

FIG. 5 shows an alternative embodiment of a smart card CPU 20' according to this invention. Here, the delay counter has been removed. In this embodiment, delay generator 48 produces a constant delay period that is imposed after every access denial. This delay period can be formulated as follows:

$$T=2^{(P-1)} \times 2^F \times D$$

where P is the number of bits in the stored password, F is the number of bits in the fail counter, and D is a constant delay interval. According to this formula, the constant value D and the size of the fail counter can be adjusted to achieve the desired level of security. In the above example, P is equal to seven and F is equal to four. If D is set to 30 seconds, the delay period will be 8.5 hours (on average), i.e., $2^{(7-1)} \times 2^4 \times 30 = 64 \times 16 \times 30$ sec=8.5 hours.

The FIG. 5 embodiment is best reserved for applications where the terminal software will supply the password. If the user supplies the password, the user is heavily penalized by an 8.5 hour delay even on the first password entry mistake.

Figure 6:
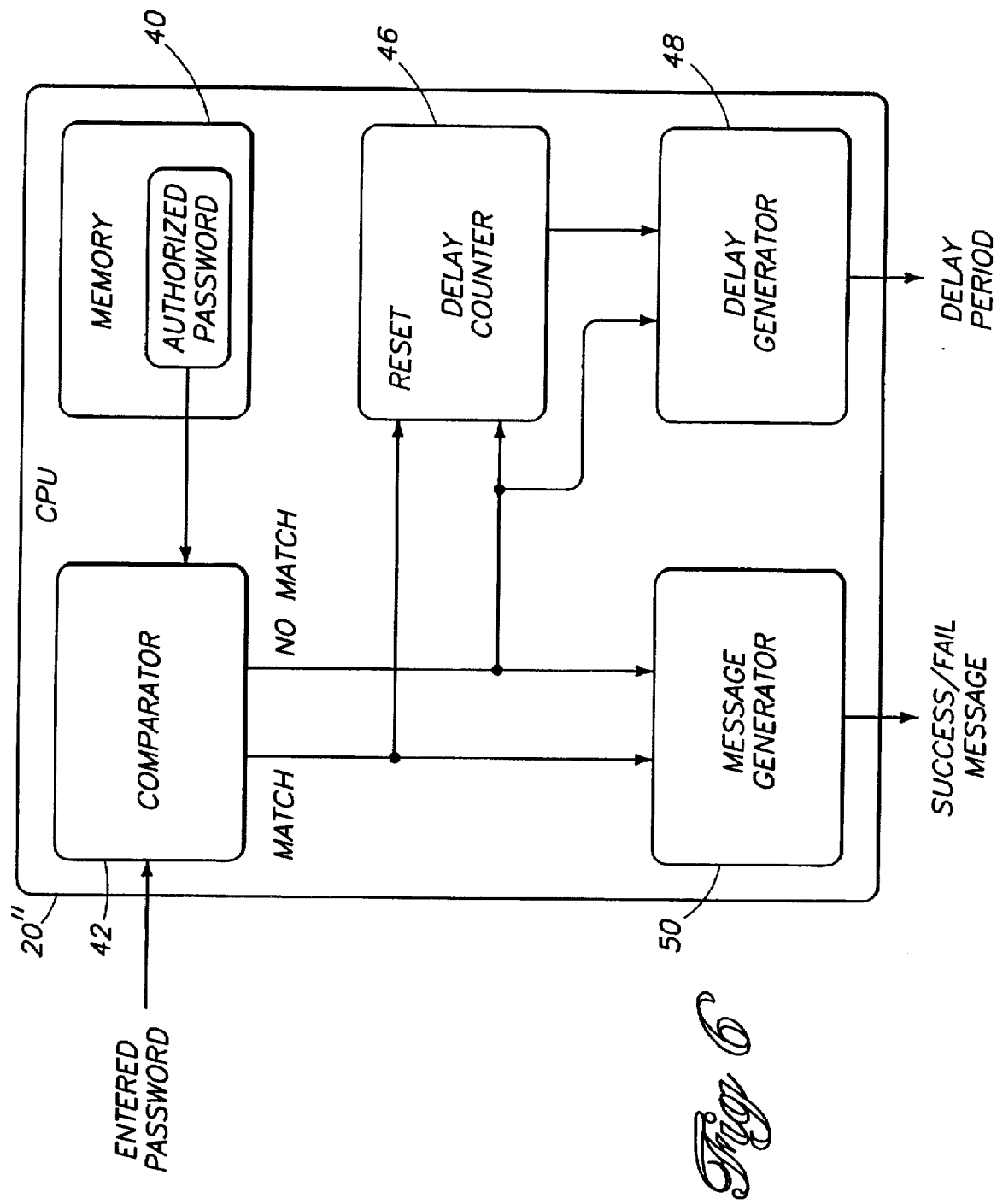
FIG. 6 is a block diagram of a CPU of the smart card microcontroller according to yet another embodiment of this invention.
Figure 7:
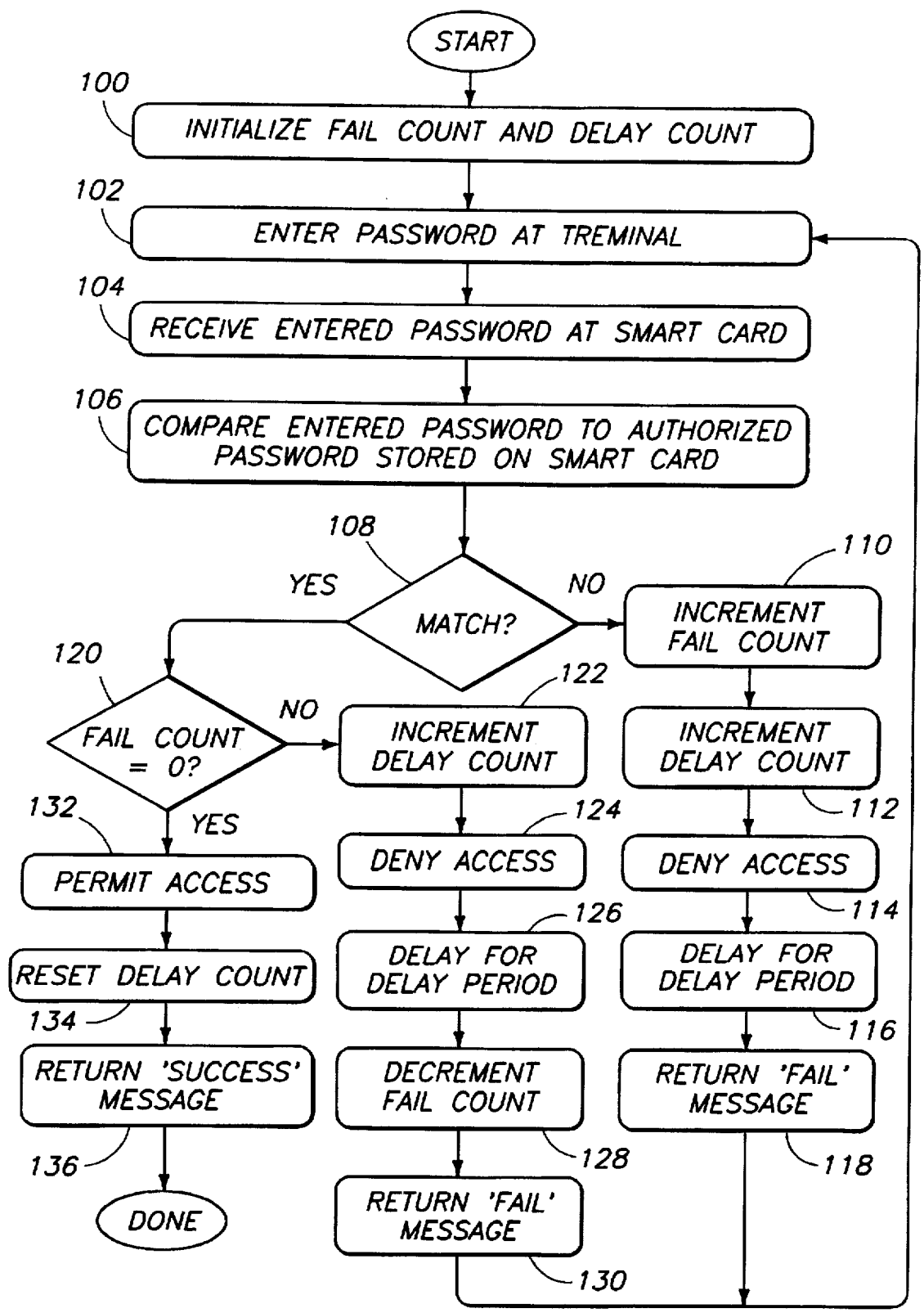
FIG. 7 is a flow diagram of preferred steps in a method for protecting against unauthorized access of data contents on a smart card according to another aspect of this invention.

FIG. 6 shows a smart card CPU 20" according to another embodiment of this invention. Here, the fail counter has been removed. Access is simply permitted when a match occurs between the entered and authorized passwords. However, when the entered passwords fail to match the authorized password, a increasingly longer delay period is imposed with each miss.

The FIG. 6 embodiment is designed for those applications where humans are guaranteed to enter the password. The increasing time period makes it physically impossible for an unauthorized user to stand at the ATM and continually guess at a new password.

FIG. 8 shows preferred steps in a method for protecting against unauthorized access of data contents on a smart card. At step 100, the fail count and delay count are initialized. The fail count is preferably initialized to a reference value of zero. At step 102, the user or terminal software enters a password at the terminal. The smart card receives this password (step 104) and compares it to the authorized password stored thereon (step 106). At step 108, it is determined whether the entered password matches the authorized password. If there is no match (i.e., the "no" branch from step 108), the fail count and delay count are both incremented (steps 110 and 112), access is denied (step 114), and a delay period is imposed in the manner described above (step 116). Preferably, the delay period monotonically increases, such as doubling the duration, with each password failure. At step 118, after the delay period has elapsed, a FAIL message is returned to the terminal. The user or terminal software then supplies a next password and the process is repeated.

With reference to step 108, if the entered and stored passwords match (i.e., the "yes" branch), it is then determined whether the fail count is equal to its reference value of zero (step 120). If it is not (i.e., the "no" branch from step 120), the delay count is incremented (step 122), access is denied (step 124), the delay is imposed (step 126), the delay count is decremented (step 128) and finally, a FAIL message is returned (step 130). Steps 122–130 are very similar to steps 110–118, but with one notable difference. In steps 110–118, the fail count is incremented before the delay is imposed, whereas in steps 122–130, the fail count is decremented after any delay is imposed. This ensures that a power loss to the smart card will not aid in avoiding the delay.

With reference again to step 120, if the fail count is equal to zero (i.e., the "yes" branch from step 120), access is permitted (step 132) and the delay count is reset (step 134). At step 136, a SUCCESS message is returned to the terminal and the password verification process is completed.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An integrated circuit (IC) card protection device for protecting against unauthorized access of data contents on an IC card, the IC card protection device comprising:

a memory to store a password;

a data input to receive an entered password;

a comparator to compare the entered password to the stored password;

a fail counter, operatively coupled to the comparator, to keep a fail count that is incremented away from a reference value when the entered password fails to match the stored password and decremented back toward the reference value when the entered password successfully matches the stored password;

a delay generator to produce a delay period when the entered password fails to match the stored password;

the IC card denying access to the data contents when the fail counter is not equal to the reference value and delaying for a delay period before undertaking comparison of the next entered password; and the IC card permitting access to the data contents when the fail counter is at the reference value and the entered and stored passwords match.

2. An integrated circuit (IC) card protection device as recited in claim 1 wherein the stored password has P bits and the fail counter has F bits, the delay period T produced by the delay generator being given as follows:

$$T=2^{(P-1)} \times 2^F \times D$$

where D is a constant delay interval.

3. An integrated circuit (IC) card protection device as recited in claim 4 further comprising a delay counter which maintains a delay count that is incremented when the entered password fails to match the stored password, the delay period produced by the delay generator being based a function of the delay count.

4. An integrated circuit (IC) card protection device as recited in claim 3 wherein the delay period (T) relates to the delay count (DelayCount) according to the following function:

$$T=2^{DelayCount}.$$

5. An integrated circuit (IC) card protection device as recited in claim 4 further comprising a delay counter which maintains a delay count that is incremented each time a comparison is made regardless of whether the entered password and the stored password successfully match or fail to match, the delay period produced by the delay generator monotonically increasing according to a function of the delay count.

6. An integrated circuit (IC) card protection device as recited in claim 5 wherein the delay period (T) is doubled with each increment of the delay count (DelayCount) according to the following function:

$$T=2^{DelayCount}.$$

7. An integrated circuit (IC) card protection device as recited in claim 4 wherein the IC card increments the fail count kept in the fail counter before delaying for the delay period and decrements the fail count after delaying for the delay period.

8. An integrated circuit (IC) card protection system for protecting against unauthorized access of data contents on IC card through human or electronic-machine tampering, the IC card protection system comprising:

an IC card;

an IC card terminal to supply an entered password for accessing the IC card;

the IC card comprising:

a memory to store a password;

a data input to receive the entered password from the IC card terminal;

a comparator to compare the entered password to the stored password;

a fail counter, operatively coupled to the comparator, to keep a fail count indicative of a number of times that the entered password fails to match the stored password, the fail counter being incremented away from a reference value when the entered password fails to match the stored password and decremented back toward the reference value when the entered password successfully matches the stored password;

a delay counter, operatively coupled to the comparator, to maintain a delay count indicative of a number of times that the entered password is compared to the stored password, the delay counter being incremented each time the comparator compares the entered password to the stored password; and in the event that the fail count kept in the fail counter does not equal the reference value, the IC card denying access to the data contents and delaying for a delay period that is a function of the delay count before comparing a next entered password received from the IC card terminal.

9. An integrated circuit (IC) card protection system as recited in claim 8 wherein the IC card permits access when the fail count kept by the fail counter is equal to the reference value and the entered and stored passwords match.

10. An integrated circuit (IC) card protection system as recited in claim 8 wherein the IC card outputs to the IC card terminal a FAIL message when access is denied.

11. An integrated circuit (IC) card protection system as recited in claim 8 wherein:

the IC card permits access when the fail count kept by the fail counter is equal to the reference value and the entered and stored passwords match; and the IC card outputs to the IC card terminal a FAIL message when access is denied and a SUCCESS message when access is permitted.

12. An integrated circuit (IC) card protection system as recited in claim 8 wherein the delay period (T) relates to the delay count (DelayCount) according to the following function:

$$T=2^{DelayCount}.$$

13. An integrated circuit (IC) card protection system as recited in claim 8 wherein the IC card increments the fail counter before delaying for the delay period and decrements the fail counter after delaying for the delay period.

14. A method for protecting against unauthorized access of data contents on an integrated circuit (IC) card, the method comprising the following steps:

(a) storing an authorized password on the IC card;

(b) initializing a fail count to a reference value;

(c) receiving an entered password;

(d) comparing the entered password to the authorized password;

(e) in the event that the entered password fails to match the authorized password, denying access to the data contents on the IC card and incrementing the fail count;

(f) in the event that the entered password successfully matches the authorized password but the fail count does not equal the reference value, denying access to the data contents on the IC card and decrementing the fail count; and (g) delaying for a delay period when access to the data contents is denied before undertaking one of steps (c) or (d) for a next entered password.

15. A method as recited in claim 14 further comprising the step of permitting access to the data contents on the IC card in the event that the entered password successfully matches the authorized password and the fail count is equal to the reference value.

16. A method as recited in claim 14 further comprising the step of increasing the delay period after each comparison of the entered password and the authorized password.

17. A method as recited in claim 14 further comprising the step of doubling the delay period after each comparison of the entered password and the authorized password.

18. A method as recited in claim 14 wherein the incrementing of the fail count in step (e) occurs before the delaying step (g) and the decrementing of the delay count in step (f) occurs after the delaying step (g).

19. A method as recited in claim 14 further comprising the step of returning a FAIL message when access is denied.

20. In a data protection system the compares an entered password to an authorized password for purposes of permitting or denying access to data content, a protection component comprises:

a fail counter to keep a fail count indicative of a number of times that the entered password fails to match the authorized password, the fail counter being initialized to a reference value;

a delay counter to maintain a delay count indicative of a number of times that the entered password is compared to the authorized password;

in the event that the entered password fails to match the authorized password, the fail counter incrementing the fail count away from the reference value and the delay counter incrementing the delay count;

in the event that the entered password successfully matches the authorized password, the fail counter decrementing the fail count back toward the reference value and the delay counter incrementing the delay count; and whereby access to the data content is denied when the fail count kept in the fail counter does not equal the reference value and a delay period that is a function of the delay count is imposed before a subsequent comparison of the entered and authorized passwords is undertaken.

21. A protection component as recited in claim 20 wherein access to the data content is permitted when the fail count kept in the fail counter is equal to the reference value and the entered and authorized passwords match.

22. A protection component as recited in claim 20 wherein the delay period (T) relates to the delay count (DelayCount) according to the following function:

$$T=2^{DelayCount}.$$

23. A protection component as recited in claim 20 wherein the fail counter is incremented before any delay period is imposed and is decremented after any delay period is imposed.

24. In a system that compares an entered password to an authorized password for purposes of permitting or denying access to data content, a method for protecting against unauthorized access to data contents comprising the following steps:

(a) initializing the fail count to a reference value;

(b) receiving an entered password;

(c) comparing the entered password to an authorized password;

(d) in the event that the entered password fails to match the authorized password, (1) denying access to the data contents, (2) incrementing a fail count, (3) delaying for a delay period that is a function of a delay count before undertaking one of steps (b) or (c) for a next entered password, and (4) incrementing the delay count;

(e) in the event that the entered password successfully matches the authorized password and the fail count does not equal the reference value, (1) denying access to the data contents, (2) decrementing the fail count, (3) delaying for the delay period before undertaking one of steps (b) or (c) for a next entered password, and (4) incrementing the delay count; and (f) in the event that the entered password successfully matches the authorized password and the fail count is equal to the reference value, permitting access to the data contents.

25. A method as recited in claim 24 wherein the delay period is increased when the delay count is incremented.

26. A method as recited in claim 24 further comprising the step of delaying for a delay period (T) that relates to the delay count (DelayCount) according to the following function:

$$T=2^{DelayCount}.$$

27. A method as recited in claim 26 further comprising the step of resetting the delay count when access to the card is permitted following a match between the entered password and the authorized password.

28. A method as recited in claim 26 wherein the incrementing of the fail count occurs before the delaying for the delay period and the decrementing of the delay count occurs after the delaying for the delay period.

* * * * *